(12) United States Patent
Line et al.

(10) Patent No.: US 12,409,637 B2
(45) Date of Patent: Sep. 9, 2025

(54) DIGITAL PRINTING ON A WOOD-BASED SUBSTRATE FOR EXTERIOR APPLICATION

(71) Applicant: LOUISIANA-PACIFIC CORPORATION, Nashville, TN (US)

(72) Inventors: Jarrod Kevin Line, Brentwood, TN (US); Sarath Vega-Gutierrez, Nashville, TN (US)

(73) Assignee: LOUISIANA-PACIFIC CORPORATION, Nashville, TN (US)

( * ) Notice: Subject to any disclaimer, the term of this patent is extended or adjusted under 35 U.S.C. 154(b) by 0 days.

(21) Appl. No.: 16/991,994

(22) Filed: Aug. 12, 2020

(65) Prior Publication Data

US 2021/0046741 A1 Feb. 18, 2021

Related U.S. Application Data

(60) Provisional application No. 62/885,329, filed on Aug. 12, 2019.

(51) Int. Cl.
*B32B 21/02* (2006.01)
*B32B 21/06* (2006.01)
(Continued)

(52) U.S. Cl.
CPC .............. *B32B 21/02* (2013.01); *B32B 21/06* (2013.01); *B32B 38/145* (2013.01); *C09D 11/02* (2013.01);
(Continued)

(58) Field of Classification Search
CPC ..... B32B 21/02; B32B 21/06; B32B 2250/03; B32B 2255/01; B32B 2255/26;
(Continued)

(56) References Cited

U.S. PATENT DOCUMENTS 4,409,275 A 10/1983 Samowich
10,556,461 B2 * 2/2020 Buhlmann ................ B44C 5/04
(Continued)

FOREIGN PATENT DOCUMENTS

KR          100997149 B1 * 11/2010
WO     WO-2014102046 A1 *  7/2014  ............. B32B 27/10

OTHER PUBLICATIONS

International Search Report for PCT/US20/46020.*

(Continued)

*Primary Examiner* — Sonya M Sengupta
(74) *Attorney, Agent, or Firm* — Wayne Edward Ramage; Baker Donelson

(57) ABSTRACT

A system and related methods for high-resolution digital printing on wood-based substrates for exterior applications or outdoor use. Textured wood-based substrates include, but are not limited to, plywood, wood planks, oriented-strand board (OSB), laminated strand lumber (LSL), laminated veneer lumber (LVL), paper board, and various forms of engineered wood. A manufactured or engineered wood product with an engineered orientation is used as the base substrate to minimize deformation. A resin-impregnated paper overlay, which may include a special adhesion-promoting primer layer, is placed on the surface that will be subject to exposure outdoors. An image or images are printed using UV-resistant inks or film coatings, and a protective layer applied over the printed ink. The elasticity of the ink or film coating and the protective layer should match the protective overlay.

14 Claims, 2 Drawing Sheets

(51) Int. Cl.
*B32B 38/00* (2006.01)
*C09D 11/02* (2014.01)

(52) U.S. Cl.
CPC ... *B32B 2260/028* (2013.01); *B32B 2260/046* (2013.01)

(58) Field of Classification Search
CPC .......... B32B 2255/28; B32B 2260/026; B32B 2260/028; B32B 2260/046; B32B 2307/4023; B32B 2307/7265; B32B 2307/75; B32B 2317/125; B32B 2317/16; B32B 27/10; B32B 38/145; C09D 11/02; B44C 5/04
See application file for complete search history.

(56) References Cited

U.S. PATENT DOCUMENTS

| | | |
|---|---|---|
| 2004/0045240 A1 | 3/2004 | McIlvaine |
| 2007/0002119 A1 | 1/2007 | Abrott |
| 2011/0059269 A1 | 3/2011 | Baratto et al. |
| 2013/0273309 A1* | 10/2013 | Schaefer ................ B32B 5/028 428/317.1 |
| 2015/0251486 A1 | 9/2015 | Hannig |
| 2017/0314273 A1* | 11/2017 | Hugi ..................... E04F 15/107 |
| 2017/0355219 A1* | 12/2017 | Clement ................... B44C 5/04 |
| 2018/0264874 A1* | 9/2018 | Buhlmann .............. B32B 27/10 |
| 2019/0160844 A1 | 5/2019 | Skoog |

OTHER PUBLICATIONS

Written Opinion for PCT/US20/46020.*
Translation of EP3053757.*
Translation of WO2011003763.*
Translation of WO2016135463.*
Communication Pursuant to Article 94(3) Epc, Ep 20852610.3, Lousiana-Pacific Corp. (Nov. 7, 2024).
Communication re Extended European Search Report, EP 20852610. 3, Lousiana-Pacific Corp. (Jul. 20, 2023).
Koel Blog, "Difference between Organic Pigments and Inorganic Pigments," found at https://koelcolours.com/blog/difference-organic-pigments-inorganic-pigments/#:~:text=Organic pigments are brighter compared, bright colour of organic pigments. (May 8, 2018).
Gee Long, Full Automatic OSB Production Line, found at https://web.archive.org/web/20161012055750/http://www.geelongmachinery.com:80/osbboardmachine.html (Oct. 12, 2016).
Sproul, Old Barn Interior Metal Print, found at https://fineartamerica.com/featured/old-barn-interior-dan-sproul.html?product=metal-print (May 21, 2016).

* cited by examiner

DIGITAL PRINTING ON A WOOD-BASED SUBSTRATE FOR EXTERIOR APPLICATION

This application claims benefit of and priority to U.S. Provisional Application No. 62/885,329, filed Aug. 12, 2019, which is incorporated herein in its entirety by specific reference for all purposes.

FIELD OF INVENTION

This invention relates to a system and related methods for digital printing on a wood-based substrate, including but not limited to engineered wood, for exterior application or outdoor use.

BACKGROUND OF INVENTION

Prior art exterior wood products have required repeated and regular refinishing to maintain their aesthetic quality. Naturally-durable wood products such as cedar and redwood have been used for the exterior cladding of homes for hundreds of years. Over time natural deformation of the wood, driven by shrinking and swelling from free moisture, tended to compromise finishes, and thus this type of cladding requires repeated refinishing to maintain desirable aesthetics. Engineered wood products such as plywood experience similar issues with swelling and shrinking, though perhaps at different rates than natural wood. Wood-based products will continue to deform, even at the fiber level, unless the surface can be stabilized.

Typical decay treatments would slow down or stop decay, but not change the natural deformation of the surface. These treatments serve more to stop or slow the growth of fungi rather change the water absorption characteristics of the wood. Water impervious treatments such as paraffin waxes and film forming finishes would serve to slow the surface decay affects and extend service life, though themselves would not greatly extend the aesthetic performance and generally required great effort to refinish in the field.

A further complication with wood products, even engineered wood products is that the wood fiber is typically able to take on only certain types of finishes. The high absorbency of the wood fiber required a finish with high content of water or volatile organics and a process to drive off the liquid carrier.

Other methods have been employed to create a wood fiber-based substrate which was more resistant to shrinking and swelling. Chemical methods such as phenol formaldehyde impregnation typically required significant amounts of resin to be forced into the dried wood product in an industrial setting, then a second drying process to drive off the water carrier. While successful in reducing deformation of wood products treatments are often extremely costly and have downsides with manufacturing and emissions control.

With the expectation of deformation, wood finishes are largely limited to non-film forming colorants and dyes or film forming highly flexible finishes. A stain usually highlights the existing wood grain, or a paint provides a heavy film that tend to be a very simple, mono-tone finish. The colorant and dyes tend to color the wood fiber and are very susceptible to UV fade which require frequent maintenance. Film forming finishes tend to break down due to deformation of the wood which breaks the film barrier and again requires maintenance.

A second problem for the application of film forming and decorative finishes is the adhesion to the wood fiber itself. Adhesion directly to the fiber is for the most part mechanical in nature. Since the wood will be deforming at the fiber level, mechanical bonds will begin to breakdown as the fibers change shape relative to each other. Over time this will loosen even the strongest adhesive or finish and, in some cases, the remaining adhesion will separate the fiber from the main body of the wood resulting in tear-out.

Surface deformation on wood products as discussed above continues to cause significant challenges to the long-term durability of high value finishes, such as ink jet printing, in exterior applications. Materials such as plastic (e.g., HDPE for decking, PVC for fencing, and the like) and aluminum siding have been used extensively with decorative finishes such as pre-printed films and direct-to-substrate printing. However, these techniques used on metal or plastic substrates will not work on wood products. Accordingly, there continues to be a need for a system and method for high-resolution printing on wood-based substrates for exterior application or outdoor use.

SUMMARY OF INVENTION

In various exemplary embodiments, the present invention comprises a system and related methods for high-resolution digital printing on wood-based substrates for exterior application or outdoor use. Textured wood-based substrates include, but are not limited to, plywood, wood planks, oriented-strand board (OSB), laminated strand lumber (LSL), laminated veneer lumber (LVL), paper board, and various forms of engineered wood. The present invention allows the high-quality duplication of the aesthetic and textural features of a particular type or style of board or panel on the substrate, or printing of an image or images on the substrate.

The present invention addresses the above problems with a manufactured or engineered wood product that is used as the base substrate. The engineered wood product comprises wood fibers with an engineered orientation (along with resin as a binder), which minimizes the deformation of the wood in certain orientations. A resin-impregnated paper overlay is then applied (typically during the manufacturing process or during finishing) over the engineered wood substrate. In one embodiment, the paper overlay is a medium density resin-impregnated paper overlay. The combination of the oriented substrate and the paper overlay provides an ideal surface for application of printed images subject to exposure outdoors. In a further embodiment, the paper overlay may be impregnated with an additional primer layer.

In several additional embodiments, the ink used for printing is formulated for outdoor use. The ink may be a plurality of UV-resistant inks applied to the surface with a variety of printing technologies (e.g., transfer, rotogravure and/or ink jet systems). A clear or transparent protective layer also may be applied over the printed ink on the surface. This protective layer may be in solid form (e.g., film overlay) or liquid form (e.g., liquid coating). In several embodiments, the protective layer may be applied during and/or after the printing process.

The image or images printed can be in any form, and may include drawings, pictures, scanned images (modified and unmodified), photographs, letters, words, numbers, icons or other forms of graphic images, or combinations thereof. For example, the image may be obtained from a high-resolution scan of a board, wood or other surface, or image to be duplicated. The scan data is stored in an electronic data file, and may be modified, if desired, including, but not limited to, the addition of custom foreground or background images. The scanned image is not limited to wood, and any material (e.g., brick, stone, or the like) or image can be replicated on the substrate. The image is then printed on one or more substrates prepared as described above in a production line using a large-scale production printer. The printing duplicates the image and also can add texture and depth, based on the thickness of ink applied. The finished product may be specially packaged.

DETAILED DESCRIPTION OF EXEMPLARY EMBODIMENTS

Figure 1:
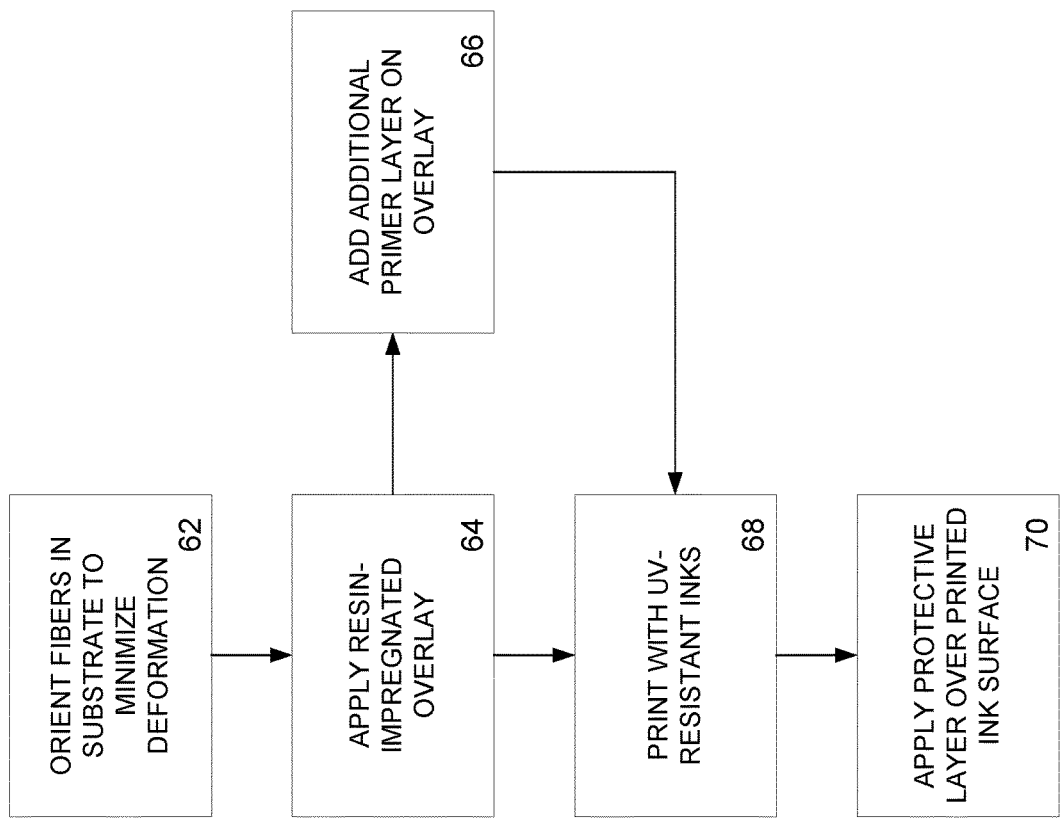
FIG. 1 shows a view of a system in accordance with an exemplary embodiment of the present invention.
Figure 2:
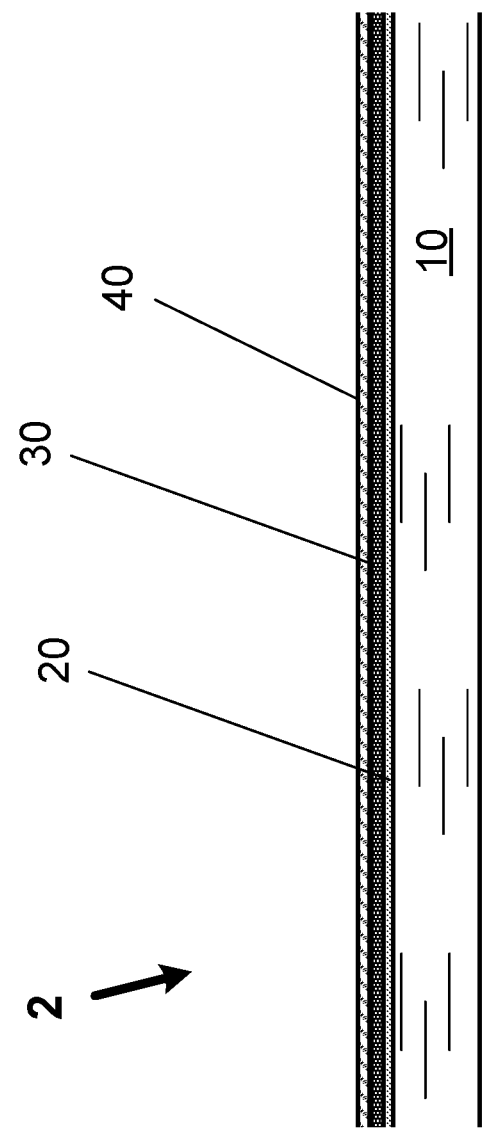
FIG. 2 shows a view of a multi-layered wood-substrate product for exterior use in accordance with an exemplary embodiment of the present invention.

In various exemplary embodiments, the present invention comprises a system and related methods for high-resolution digital printing on wood-based substrates for exterior application or outdoor use. Textured wood-based substrates include, but are not limited to, plywood, wood planks, oriented-strand board (OSB), laminated strand lumber (LSL), laminated veneer lumber (LVL), paper board, and various forms of engineered wood. The present invention allows the high-quality duplication of the aesthetic and textural features of a particular type or style of board or panel on the substrate, or printing of an image or images on the substrate. The engineered wood substrate and product 2 can be of any type used in an exterior application, including, but not limited to, fencing, fence panels, fence pickets, fence posts or other components, decking, deck planks, deck beams, deck posts, deck beams or other components, siding or siding components, roofing or roofing components, exterior doors, outdoor posts or supports, and the like.

Printing images onto wood products has been limited to interior applications since wood will tend to shrink and swell (and warp) in exterior conditions (i.e., outdoors), thereby causing the image to distort and/or break. The movement is caused by the gain and loss of moisture, which causes the swelling and shrinking (respectively) of the wood fiber. This translates into gross swell as well as deformation of the wood product. While non-wood products have been used in exterior applications, wood or engineered wood is less expensive and provides a more authentic look and feel as compared to non-wood products.

The present invention addresses the above-described problems with a manufactured or engineered wood product that is used as the base substrate. A class of engineered-wood products are multilayer oriented wood strand particle boards, particularly those with a layer-to-layer oriented strand pattern, such as "OSB". Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes.

Certain oriented board products can be made from flakes that are created from debarked round logs by placing the edge of a cutting knife parallel to a length of the log and the slicing thin flakes from the log. The cut flakes are subjected to forces that break the flakes into strands having a length parallel to the grain of the wood several times the width of the strand. The strands can be oriented on the board-forming machine with the strands predominantly oriented in a single (e.g., cross-machine) direction in one (e.g., core) layer and predominantly oriented in the generally perpendicular (machine) direction in adjacent layers.

The engineered wood substrate 10 of the present invention 2 comprises wood fibers or flakes with an engineered orientation (along with resin as a binder), which minimizes the deformation of the wood in certain orientations. The natural behavior of the wood to deform along the grains is greatly reduced by the wood construction of the engineered wood-based board or product. Whereas in the past, wood-based boards largely left the wood fiber intact throughout the manufacturing process, the engineered wood product construction used for the present invention greatly reduces the gross deformation of the product and randomizes the remaining deformation 62. Swelling in the resulting engineered-wood product is uniform in all orientations of the wood.

A resin-impregnated paper overlay 20 is then applied (typically during the manufacturing process or during finishing) over the engineered wood substrate 10. This overlay is relative rigid and water-resistant base layer that acts as a relatively non-deformable surface for the application of film-forming coatings. An adhesion-promoting primer 20 is applied to, or is present on, the outer or upper surface of this paper overlay. The primer must be compatible with the particular inks 30 being used, as described below. The resin impregnated paper 20 with adhesion-promoting primer 30 acts as a stable substrate for the application of film forming finishes, and the paper-primer combination provides uniform adhesion surface. The combination of the oriented substrate 10 and the paper overlay 20 thus provides an ideal surface for application of printed images or printed decorative surfaces subject to exposure outdoors. In one embodiment, the paper overlay is a medium density resin-impregnated paper overlay.

In several embodiments, the paper overlay 20 may already be impregnated with a primer layer 30 prior to being attached to the engineered wood substrate 10. In this embodiment, no additional primer layer may be needed, although in some embodiments, a second primer layer may be applied as well to the integrated/impregnated primer layer (i.e., effectively providing a double primer layer).

Ink jet printer coatings for the printed layer 30 are applied in a high solids content, typically UV-cured coating direct to the primed paper. These coatings are typically applied with 4-6 colors layers ranging from CMYK (Cyan, Magenta, Yellow, Black) to CMYKOG (Cyan, Magenta, Yellow, Black, Orange, Green), and can be composed of organic or inorganic inks. In several additional embodiments, the ink used for printing is formulated for outdoor use. The ink may be a plurality of UV-resistant inks applied to the surface with a variety of printing technologies (e.g., transfer, rotogravure and/or ink jet systems).

At present, organic inks provide shorter lives for UV exposures as compared to the inorganic inks. With the longer-life inorganic inks some of the brightness of colors is sacrificed. In several embodiments, viscosity should be in the range of 4 to 8 mPa, for use with printer heads using picoliters. Curing techniques include air drying and/or UV-radiation (e.g., UV-lamps), with the duration and intensity depending on the particular ink. Curing often is built into the printing system itself. Metal based inks or powder coats may be used. In such cases, heat curing may be required.

A durable, clear or transparent protective layer 40 may be applied over the printed ink layer on the surface. This protective layer 40 may be in solid form (e.g., film overlay) or liquid form (e.g., liquid coating). In various embodiments, the protective layer may be applied during and/or after the printing process, such as by jetting (printing), brushing, spraying, flood coating, and the like. The protective layer protects the printed surface from UV-light damage (i.e., the protective layer protects the underlying printed ink from UV-exposure, or reduces that exposure) as well as mechanical damage. Ink as it is applied is fragile, so a UV-cured top coating composed of one of several chemistry systems (e.g., acrylic, silicone, melamine, polyurethane) enhances the life of the product. Solid protective layers may comprise different polymers, and are applied once the printed surface has fully cured. The thickness of the protective layer is correlated with the expected service life of the resulting product.

In several embodiments, the elasticity of the ink or ink film and/or the protective layer or film (after drying or curing) should substantially match or closely approximate the paper overlay elasticity (measured by the modulus of elasticity or Young's modulus). In one embodiment, a liquid protective layer has to remain elastic enough to bear up to 10% of surface elongation. In several embodiments, the Young's modulus/modulus of elasticity for the printed ink layer is within 10% of that for the paper overlay. In additional embodiments, the Young's modulus/modulus of elasticity for the protective layer is within 10% of that for the paper overlay.

The image or images printed can be in any form, and may include drawings, pictures, scanned images (modified and unmodified), photographs, letters, words, numbers, icons or other forms of graphic images, or combinations thereof. For example, the image may be obtained from a high-resolution scan of a board, wood or other surface, or image to be duplicated. The scan data is stored in an electronic data file, and may be modified, if desired, including, but not limited to, the addition of custom foreground or background images. The scanned image is not limited to wood, and any material (e.g., brick, stone, or the like) or image can be replicated on the substrate. The image is then printed on one or more substrates prepared as described above in a production line using a large-scale production printer. The printing duplicates the image and also can add texture and depth, based on the thickness of ink applied. The finished product may be specially packaged.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An exterior-use engineered-wood product, comprising:
    a piece of exterior cladding for a structure, comprising
        a rectilinear base layer with a first surface and a second surface, said base layer comprising engineered wood;
        a paper overlay layer with a first surface and a second surface, the second surface of the paper overlay layer affixed to the first surface of the base layer, said paper overlay layer comprising a non-deformable surface of resin-impregnated paper fully impregnated with resin;
        a first primer layer affixed to or integrated with the first surface of the paper overlay layer, both configured to provide a stable and uniform adhesion surface, said first primer layer comprising an outer surface opposite the second surface of paper overlay layer;
        a print layer printed on the outer surface of the primer layer, wherein the print layer comprises UV-resistant ink formulated for outdoor use; and
        a clear or translucent protective layer overlaying the print layer opposite the primer layer;
    wherein the print layer is a scanned image duplicating the appearance of a board or wood surface different from the engineered wood base layer; and
    wherein the piece of exterior cladding is water-resistant and weather-resistant.

2. The product of claim 1, wherein the base layer comprises oriented strand board.

3. The product of claim 1, wherein the first primer layer forms part of the paper overlay layer.

4. The product of claim 1, further comprising a second primer layer affixed to the first primer layer.

5. The product of claim 1, wherein the inks comprise inorganic inks.

6. The product of claim 1, wherein the protective layer is a fluid-applied or liquid-applied layer.

7. The product of claim 1, wherein the protective layer is a solid layer.

8. The product of claim 1, wherein the elasticity of the print layer and the protective layer are approximately equal to the elasticity of the paper overlay layer.

9. A method of producing an exterior-use engineered-wood product, comprising the steps of:
    providing a rectilinear base layer comprising engineered wood formed from one or more layers of treated wood strands or flakes;
    applying a resin-impregnated paper overlay layer fully impregnated with resin on a first surface of the base layer;
    providing a primer layer as part of or attached to the resin-impregnated paper overlay layer;
    printing a print layer on an upper surface of the primer layer, wherein the step of printing comprising using an inkjet printer to print one or more images on the upper surface of the primer with UV-resistant inks; and
    after the print layer has cured or dried, applying a protective layer over an upper surface of the print layer.

10. The method of claim 9, wherein the inks comprise inorganic inks.

11. The method of claim 9, wherein the base layer comprises oriented strand board.

12. The method of claim 9, further comprising the step of applying a second primer layer prior to printing the print layer.

13. The method of claim 9, wherein the protective layer is applied by sprayers.

14. The method of claim 9, wherein the elasticity of the print layer and the protective layer are approximately equal to the elasticity of the paper overlay layer.

\* \* \* \* \*